United States Patent [19]
Gunkel et al.

[11] Patent Number: 5,625,492
[45] Date of Patent: Apr. 29, 1997

[54] COLOR COMPENSATION FILTER

[75] Inventors: Claus Gunkel, Giessen; Erwin Hisge, Ehringshausen, both of Germany

[73] Assignee: Leica Mikroskopie und Systeme GmbH, Wetzlar, Germany

[21] Appl. No.: 244,054

[22] PCT Filed: Sep. 15, 1993

[86] PCT No.: PCT/DE93/00867

§ 371 Date: May 13, 1994

§ 102(e) Date: May 13, 1994

[87] PCT Pub. No.: WO94/07159

PCT Pub. Date: Mar. 31, 1994

[30] Foreign Application Priority Data

Sep. 18, 1992 [DE] Germany .......................... 42 31 269.8
Sep. 19, 1992 [DE] Germany .......................... 42 31 437.2

[51] Int. Cl.$^6$ .................................................. G02B 5/28
[52] U.S. Cl. ........................... 359/586; 359/588; 359/589; 362/293
[58] Field of Search ..................................... 359/589, 588, 359/586, 385, 389; 362/293

[56] References Cited

U.S. PATENT DOCUMENTS

| 4,145,113 | 3/1979 | Ranninger et al. | 350/166 |
| 4,896,928 | 1/1990 | Perilloux et al. | 359/589 |
| 5,099,359 | 3/1992 | Hrycin et al. | 359/587 |

FOREIGN PATENT DOCUMENTS

| 0300579 | 1/1989 | European Pat. Off. | G02B 5/28 |
| 0438646 | 7/1991 | European Pat. Off. | B60R 1/08 |
| 2358667 | 2/1978 | France | G02B 5/22 |
| 0215371 | 9/1986 | Germany | 359/589 |
| 60-88902 | 5/1985 | Japan | 359/588 |
| 1270042 | 4/1972 | United Kingdom | 359/589 |

*Primary Examiner*—Timothy P. Callahan
*Assistant Examiner*—Terry L. Englund
*Attorney, Agent, or Firm*—Bean, Kauffman & Spencer

[57] ABSTRACT

An interference filter having 17 coatings of alternating high and low index materials is located on the illumination path of an optical device and provides correction for green color distortion on the observation path and correction for blue color distortion on the photo path in order that both the observed image and photographed image are color neutral.

18 Claims, 2 Drawing Sheets

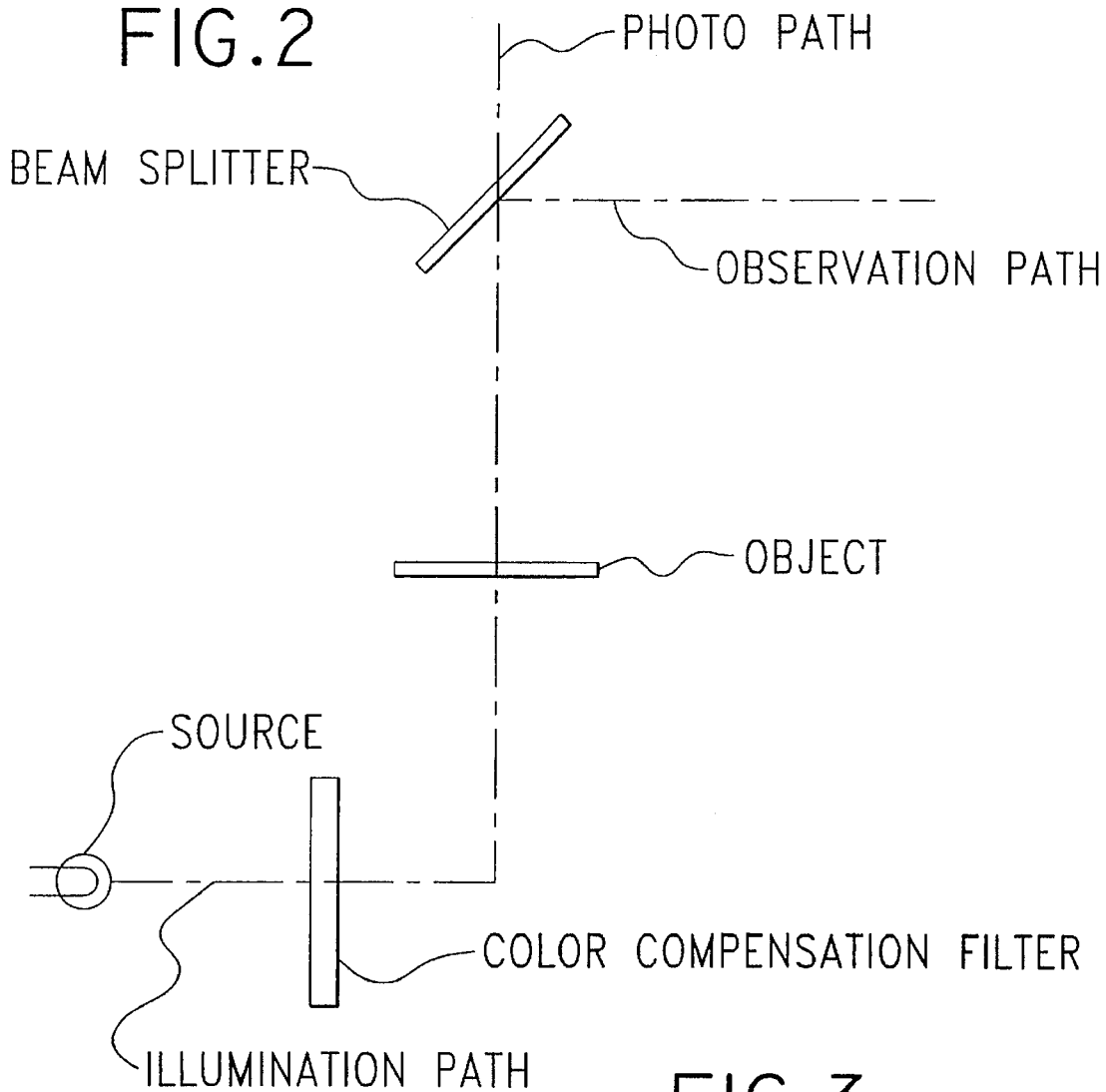
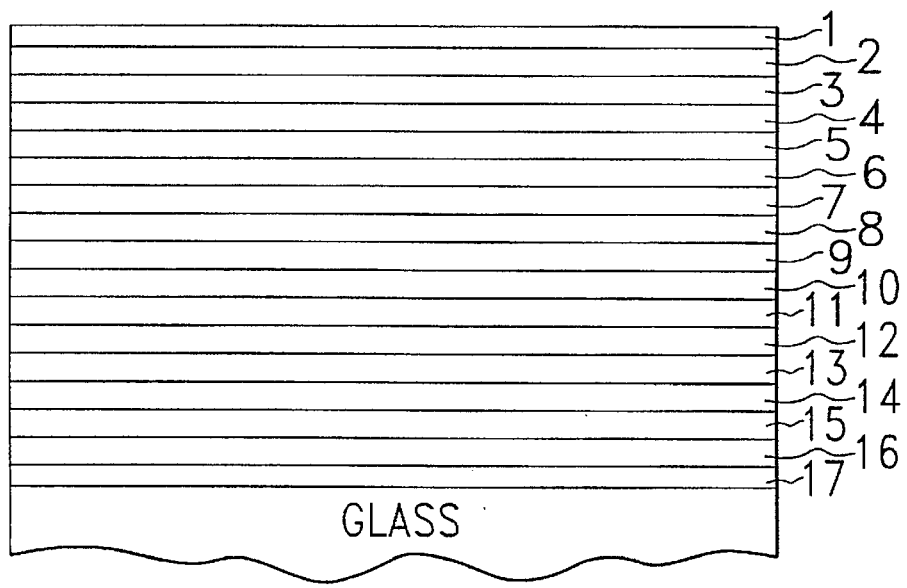

COLOR COMPENSATION FILTER

BACKGROUND OF THE INVENTION

The invention pertains to a color compensation filter for optical devices comprising observation and photo ray paths, in particular for microscopes. Complex optical devices that, apart from the usual photo ray path, are equipped with an observation ray path may require the correction of color distortions that are caused by the effects of the optical components on the spectrum in connection with the weighting of the color sensitivity of the film material. This can result in color distortions in that part of the ray path directed at the observer (observer ray path) that are different from those of the part of the ray path being used for recording purposes (photo ray path). Such a case involves the correction, or rather compensation, of a combination of color distortions.

BRIEF DESCRIPTION OF THE DRAWINGS

FIG. 2 is a diagram of light paths in a microscope; and

FIG. 3 shows a section through a color compensating filter according to the present invention.

Figure 1:
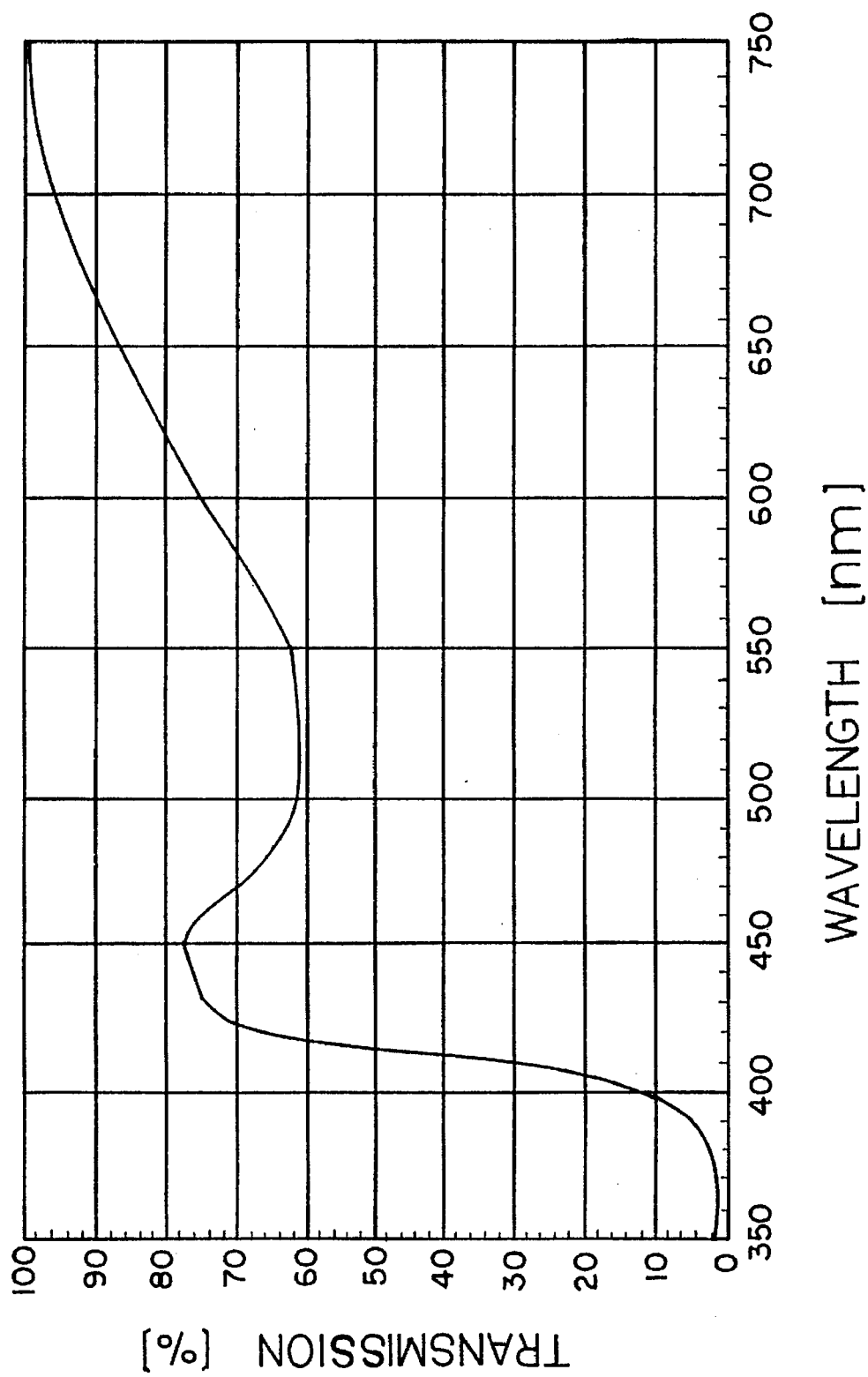
FIG. 1 is a graph of the light tranmission characteristics of a filter according to the present invention.

It is the task of the invention discussed here to insert a compensation filter in the optical ray path of complex devices of this type, which, in turn, allows for selective color compensation in various wave-length areas.

The problem is solved through the use of a color compensation filter which consists of a layered interference filter.

DETAILED DESCRIPTION OF THE INVENTION

FIG. 1 illustrates the effect on the spectrum of the layered interference filter system of this invention. A wide, basin-shaped saddle between 470 nm and 580 nm can be seen in the green area. This area of a selected transmission reduction of the color green is responsible for the correction of the color distortion of the color green.

The sharp upswing in FIG. 1 at between 390 and 430 nm—the 50% factor of the transmission is 423±5—is responsible for the reduction of the shorter wave lengths, so that the additional color distortion of the color blue is corrected.

The structure of the component layers as shown in FIG. 3 is outlined in the following chart:

| Layer | Refractive Index | Optical, Thickness t ($\lambda$ = 500 nm) |
|---|---|---|
| 1 | $n_H$ = 2.05 | 0.6630 * $\lambda/4$ |
| 2 | $n_L$ = 1.38 | 0.4700 * $\lambda/4$ |
| 3 | $n_H$ = 2.05 | 2.0773 * $\lambda/4$ |
| 4 | $n_L$ = 1.38 | 0.9616 * $\lambda/4$ |
| 5 | $n_H$ = 2.05 | 0.9722 * $\lambda/4$ |
| 6 | $n_L$ = 1.38 | 0.4910 * $\lambda/4$ |
| 7 | $n_H$ = 2.05 | 0.9722 * $\lambda/4$ |
| 8 | $n_L$ = 1.38 | 0.4910 * $\lambda/4$ |
| 9 | $n_H$ = 2.05 | 0.9722 * $\lambda/4$ |
| 10 | $n_L$ = 1.38 | 0.4910 * $\lambda/4$ |
| 11 | $n_H$ = 2.05 | 0.9722 * $\lambda/4$ |
| 12 | $n_L$ = 1.38 | 0.4910 * $\lambda/4$ |
| 13 | $n_H$ = 2.05 | 0.9722 * $\lambda/4$ |
| 14 | $n_L$ = 1.38 | 0.4910 * $\lambda/4$ |
| 15 | $n_H$ = 2.05 | 0.7495 * $\lambda/4$ |
| 16 | $n_L$ = 1.38 | 0.6179 * $\lambda/4$ |

-continued

| Layer | Refractive Index | Optical, Thickness t ($\lambda$ = 500 nm) |
|---|---|---|
| 17 | $n_H$ = 2.05 | 0.3019 * $\lambda/4$ |

Layer 1 borders on the medium air (refractive index n=1); layer 17 is on the glass substrate, which has a refractive index $n_G$ between 1.57 and 1.9. The angle of incidence can be between 0° and ±10°. H refers to a high refractive substance with a refractive index $n_H$=2.05, that can vary by a factor of ±0.05. The material referred to here belongs to the group zirconium dioxide ($ZrO_2$), tantalum pentoxide ($Ta_2O_5$), hafnium (IV) oxide ($HfO_2$), or a mixture of metal oxides and rare earth oxides. The material with the refractive index $n_L$=1.38 is magnesium fluoride ($MgF_2$).

As is indicated in the chart, the component layers 7/8, 9/10, 11/12 and 13/14 represent identical layers of layers 5/6.

The interference filter discussed here selectively alters the light intensity of the various wave-length areas, so that, for instance, the photomicrographs provide a color-neutral reproduction of the microscopic object. As shown in FIG. 2, the visual observation of an object through the microscope also shows a color-neutral image. In addition, the interference filter is applied to a glass surface on which no other layer of any sort has been placed before. This is the case with a diffusing screen, for instance, which is located inside the illumination ray path of the optical device. The interference filter being introduced here can basically be applied to either side of the diffusing screen. It is, however, advisable to apply it to the smooth, flat side. The diffusing screen is positioned perpendicular to the illumination ray path. The suggested layer sequence simplifies this rather common positioning. Another advantage of a diffusing screen, is that it is an optical component that is easily retrieved, so that the replacement of this particular part is a relatively uncomplicated procedure. This allows for the correction of color distortion defects without having to dismantle all of the parts of the optical device entirely. By no longer requiring an additional substrate support for the interference filter, yet another function of the diffusing screen (in addition to its intended function) is demonstrated.

The diffusing screen is located inside the illumination ray path in front of the aperture stop (on the lamp side). The position is, for the most part, a minor concern for the interference filter. Care must, however, be taken to insure that the interference filter is located inside the illumination ray path, since the light that is not transmitted through the interference filter is essentially reflected.

With the invention discussed here, a variation of ±5% must be taken into account for the optical thicknesses indicated in the diagram as well as the claim. The manufacturing of the interference filter occurs in a high vacuum by a vaporization process.

What is claimed is:

1. A color compensation filter for an optical device having a light source, an illumination path, an observation path and a photo path, said color compensation filter consisting of an interference filter means positioned on said illumination path for providing correction for color distortion of green in the observation path and color distortion of blue in the photo path, said filter means consists of a glass plate having a surface and a plurality of seventeen alternating high and low index coatings supported by said surface, said plurality beginning and ending with a coating having a high index, said high index is 2.00 to 2.10 and said low index is 1.38.

2. The color compensation filter according to claim 1, wherein said glass plate has an index of refraction of 1.52 to 1.9, said surface is smooth, said high index is 2.05, and each of said plurality, beginning adjacent said glass surface, has a respective thickness of $0.3019*\lambda/4$, $0.6179*\lambda/4$, $0.7495*\lambda/4$, $5*(0.4910*\lambda/4$, $0.9722*\lambda/4)$, $0.9616*\lambda/4$, $2.0773*\lambda/4$, $0.4700*\lambda/4$, and $0.6630*\lambda/4$ and $\lambda=500$ nm.

3. The color compensation filter according to claim 2, wherein said low index coatings are magnesium fluoride and said high index coatings are selected from the group consisting of zirconium dioxide, tantalum pentoxide, hafnium dioxide, and a mixture of metallic oxides and/or rare earth oxides.

4. The color compensation filter according to claim 1, wherein said glass plate is a defusing screen and said surface is smooth.

5. The color compensation filter according to claim 2, wherein said glass plate is a defusing screen and said surface is smooth.

6. The color compensation filter according to claim 3, wherein said glass plate is a defusing screen and said surface is smooth.

7. The color compensation filter according to claim 4, wherein said defusing screen replaces a defusing screen previously existing in said optical device.

8. The color compensation filter according to claim 5, wherein said defusing screen replaces a defusing screen previously existing in said optical device.

9. The color compensation filter according to claim 6, wherein said defusing screen replaces a defusing screen previously existing in said optical device.

10. The color compensation filter according to claim 4, wherein light from said source strikes said defusing screen at an angle of incidence within ±10°.

11. The color compensation filter according to claim 5, wherein light from said source strikes said defusing screen at an angle of incidence within ±10°.

12. The color compensation filter according to claim 6, wherein light from said source strikes said defusing screen at an angle of incidence within ±10°.

13. The color compensation filter according to claim 7, wherein light from said source strikes said defusing screen at an angle of incidence within ±10°.

14. The color compensation filter according to claim 8, wherein light from said source strikes said defusing screen at an angle of incidence within ±10°.

15. The color compensation filter according to claim 9, wherein light from said source strikes said defusing screen at an angle of incidence within ±10°.

16. The color compensation filter according to claim 13, wherein said optical device is a microscope.

17. The color compensation filter according to claim 14, wherein said optical device is a microscope.

18. The color compensation filter according to claim 15, wherein said optical device is a microscope.

\* \* \* \* \*